Oct. 29, 1940.					W. A. HAYES ET AL					2,219,649
SOLDERING IRON
Filed June 8, 1938
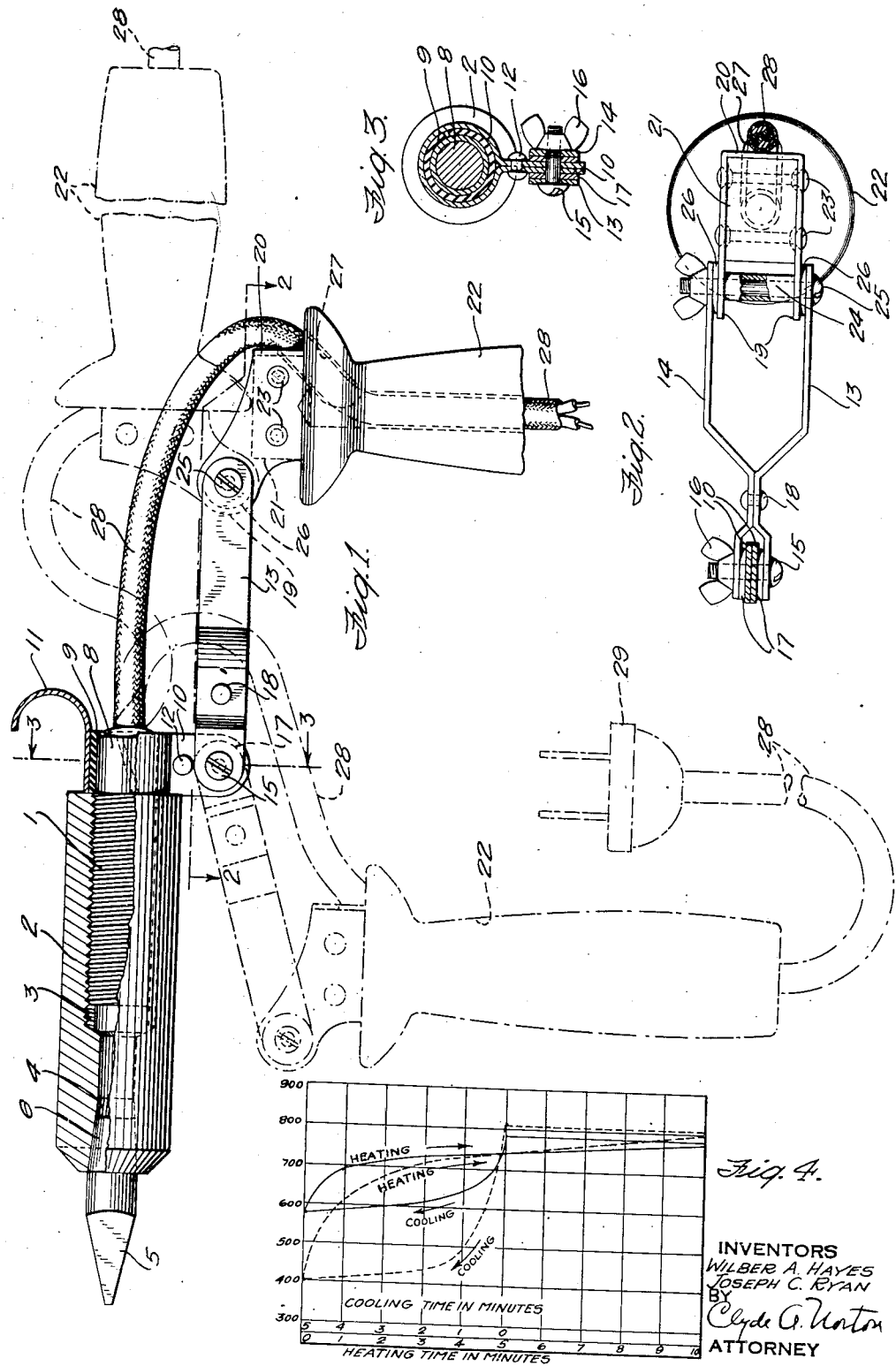
INVENTORS
WILBER A. HAYES
JOSEPH C. RYAN
BY
Clyde G. Unton
ATTORNEY Patented Oct. 29, 1940

2,219,649

UNITED STATES PATENT OFFICE 2,219,649

SOLDERING IRON

Wilbur A. Hayes and Joseph C. Ryan, Buffalo, N. Y., assignors to Colonial Radio Corporation, Buffalo, N. Y.

Application June 8, 1938, Serial No. 212,466

5 Claims. (Cl. 219—26)

This application relates to soldering or like irons, and more particularly to such irons arranged to be electrically heated.

Electrically heated soldering irons have been available on the market commercially for a considerable period, and it might be supposed that tools which are so widely used commercially would have attained a high order of efficiency. An investigation of such irons made by us and which we believe included all conventional irons indicated, however, that the design and construction thereof left much to be desired.

One of the most serious drawbacks which we have found in such conventional irons is poor temperature or heat "regulation", that is to say, extreme fluctuation of tip temperature with load, and which may be regarded as somewhat analogous to voltage regulation of an electric generator with changes in load. This poor regulation evidences itself by an excessive rise in tip temperature when the iron is running idle and by an excessive drop in tip temperature under load.

It might be supposed that a drop in tip temperature under load could be overcome by generating a greater amount of heat in the heating element. However, our investigation has shown that irons which exhibit poor regulation are not susceptible of correction by generation of additional heat; that is, regulation follows from the design and construction of the iron itself, and is not a function of the amount of heat generated in it.

In one case with a conventional iron, we found that with an extremely high internal heating element temperature, only approximately 300° below the melting point of copper, after five minutes of load, the tip temperature dropped to 360° F., but when the iron was running idle, the temperature rose to over 1300° F., a temperature which is sufficient to burn off the "tinning" on the tip in about five seconds, and causes rapid deterioration of the tip itself. For most purposes the tip temperature should not exceed 850° F. when idle, and should not drop substantially below 600° in five minutes while continuously heating a thermal load of 0.220 B. t. u.

Time studies made on operators using conventional irons show that considerable time is lost by the operators because the drop in tip temperature under load reaches such a point that effective soldering is impossible, this requiring the operator either to stop work to let the iron run idle to temperature recovery, or to use two irons alternately, one recovering while the other is being used.

Clearly, it is undesirable for operators to have to interrupt work to allow the iron to recover satisfactory soldering temperature, and it is equally undesirable for a manufacturer to have to furnish and keep in operation two irons for each operator.

Conventional irons are unsatisfactory for still another reason. The usual type of iron resembles a screw-driver in shape, and while this shape is very convenient, and is sometimes most desirable for certain types of work, for other types it is awkward and excessively time-consuming for the operator to use, and a so-called pistol grip is more easily used.

With these points in mind, we have provided a soldering iron which gives very satisfactory results. Time studies on soldering irons embodying our invention have shown that our irons are much more effective in steady soldering operations than conventional irons of greater power rating. With the foregoing in mind, it may be noted that among the objects of our invention are:

To provide a soldering iron which will not reach excessive tip temperatures when running idle, even though burning steadily, and which also will maintain a sufficiently high tip temperature to do efficient soldering under steady load.

To provide an iron having the characteristics above set forth which does not require thermostatic or other switching to maintain its temperature within efficient soldering limits, regardless of whether it is running idle or under steady load.

To provide an iron of the class described which will be relatively simple and inexpensive to manufacture and in which replacements or changes of tip and heating element may be easily and quickly effected.

To provide a soldering iron of the class desired having a handle so arranged that the same may be adjusted so that the handle is coaxial with the iron, or may be adjusted to form a pistol grip in which the position of the grip with respect to the body of the iron may be varied while still maintaining the same angular relation between the center line of the handle or grip and the center line of the iron.

Still other objects and advantages of our invention will be apparent from the specification.

In this application we have particularly pointed out and distinctly claimed the part, improvement or combination which we believe to be our invention or discovery and we have explained the principles thereof and the best mode in which we have contemplated applying those principles, so as to distinguish our invention from other inventions.

In the drawing—

Fig. 1 is a side elevation, partly in section, of a soldering iron according to our invention, one position of the handle being shown in full lines and two alternative positions being shown in dotted lines.

Fig. 2 is a section on lines 2—2 of Fig. 1.

Fig. 3 is a section on lines 3—3 of Fig. 1.

Fig. 4 is a set of temperature-time curves of a conventional soldering iron and of a soldering iron according to our invention taken under identical conditions and showing the effect of our invention.

Referring now more specifically to the drawing, 1 represents a heating element of any suitable type and power rating for the particular work required. Since heating elements are commercially available on the market in the form of rods and may be purchased under various trade names, they are not described in detail. The heating element 1 may be provided with screw threads engaged in corresponding screw threads 3 in the interior of the body 2, which may be axially drilled and the outer end tapered to form a conical seat 4 for the tip 5, which is preferably given a conical taper 6 to engage the conical seat 4.

This seat and the taper of the tip are made relatively long so as to give a large contact area between tip and body, in order to reduce the thermal resistance of the heat flow path from the body to the tip.

The material and surface of the body 2 are of great importance in obtaining good regulation. Since in actual soldering, heat is not withdrawn from the tip continuously, but intermittently, the body of the iron should have as high a thermal inertia as possible, consistent with other factors entering into the design, such as weight, bulk, balance, etc. This provides a thermal effect analogous to the mechanical effect of a flywheel on an engine, and reduces the tip temperature differential between idle and loaded running.

In conventional irons it is customary to provide a thermal inertia in the iron of from 15 to 20 M. B. t. u. per °F., although some irons have a thermal inertia of as little as 12, with power inputs ranging from 60 to 200 watts. In irons according to our invention we provide a thermal inertia of a much larger order, which may be as high as 400 M. B. t. u. per °F., in which case, with 150 watts input, we have found that the tip temperature does not exceed approximately 715° F. when running idle and that the drop in tip temperature supplying a constant load of 0.220 B. t. u. for five minutes does not exceed approximately 115°.

For most satisfactory results in a heavy duty iron with a heating element of 120 watts, we prefer to provide a thermal inertia of approximately 186. This gives an idle tip temperature not exceeding 900°, and a tip temperature not substantially less than 700° after five minutes of supplying a constant load of 0.220 B. t. u. For ordinary work, that is, not heavy duty, we prefer that the thermal inertia should be approximately 66, with a heating element of 90 watts, this iron developing an idle tip temperature of approximately 780° to 790° F. and a tip temperature of approximately 580° F. after five minutes of supplying a constant load of 0.220 B. t. u.

To minimize heat loss by radiation and thereby increase efficiency, the surface of body 2 should have a bright or polished finish which it should retain under conditions of use. Various materials were tried and found unsuitable for various reasons, such as corrosion of surface under use (which increases heat radiation and thereby reduces the efficiency and likewise the regulation to a considerable extent), insufficient thermal inertia, which likewise causes poor regulation, and it was finally found that a very satisfactory material from all standpoints is aluminum or aluminum alloy.

For example, the thermal inertia of bronze is $6\eta$ where $\eta$ is the weight of the body in ounces and 6 the thermal inertia factor of bronze; the thermal inertia of copper is $6.26\eta$; the thermal inertia of stainless steel is $10\eta$ and the thermal inertia of aluminum is $16.25\eta$. The specific heat of aluminum is 0.26 gram calories per gram per degree centigrade. The latter is easily machined and, although relatively soft so that it scratches easily if carelessly handled, is easily buffed and brought back to a bright finish and the surface finish stands up well under heat. Also, it has a low weight for given volume, and relatively low cost for given volume.

A further advantage is that while the tip (usually copper) is held firmly in position when hot, yet when cool the tip may be easily indexed; that is to say, rotated in its seat to a particular angle with the body, and both tip and heater are easily replaced, there being little or no tendency for them to "freeze" into the body.

The improvement in performance which our invention provides is clearly shown in Fig. 4, in which the dotted line curve is a regulation curve of a typical conventional iron of 100 watt rating, and the solid line curve is a regulation curve of an iron embodying our invention using a 90 watt heating element, these curves being taken both for the heating and cooling cycles. In taking these curves, the current was turned on and the iron allowed to burn idle until the tip temperature had reached a constant value.

At this point a calorimeter representing a load of 0.220 B. t. u. was applied to the tip and temperature readings were taken for five minutes, at which time the calorimeter was removed and the iron allowed to recuperate for a period of ten minutes and the temperatures plotted, the tip temperatures being taken during this period also. The same procedure was followed with irons according to this invention.

These curves form a loop at the left of the figure analogous to a hysteresis loop and the shape and form of this loop is an excellent indicator of the regulating quality of the iron. If the loop is relatively wide and considerably inclined to the horizontal axis, it indicates a large differential between idle and load temperature and poor regulation.

In the conventional iron curve it will be noted that this temperature differential was equal to 400° F. approximately. On the other hand, it will be seen that the iron embodying our invention, shows a very flat loop having a small inclination to the horizontal axis, and has a differential of only 200° F. between idle and load tip temperatures. This is very satisfactory regulation, and means in operation high thermal efficiency, maximum soldering efficiency, and maximum life of tip and heater element. It will be noted that although our iron draws ten watts less than the conventional iron, under load it maintains a tip temperature 200° higher than that of the conventional iron.

The handle of the iron is preferably secured to the extending portion 8 of the heating element, which extending portion may be left unthreaded. Heat and electrical insulation may be provided by surrounding this cylindrical portion by means of a diagonally split insulating cylinder 9, which is surrounded by a circular clamp 10 having at one side thereof a hook 11, by means of which the iron may be hung up conveniently near the operator when soldering is interrupted.

The two ends of the clamp 10 may be riveted or otherwise secured together as at 12 to hold securely on the insulating cylinder 9 and, hence, on the heating element 1, and the links 13 and 14 which extend from the clamp 10 to the grip may be bolted over the end of the clamp 10 by means of bolt 15 and nut 16, washers 17 being interposed, if desired, to provide an easy friction adjustment of the angle of links 13 and 14 with the axis of the body 2.

These links may be riveted or otherwise secured together as at 18 and may then diverge to engage arms 19 extending from bracket 20 which may be suitably secured about a rectangular upwardly extending projection 21 from grip 22, the bracket 20 being secured to the projection 21 in any desired manner, as for example, by bolts or screws 23 extending therethrough. Spacer element 24 may surround bolt 25 and spacing washers 26 may be interposed in a manner similar to the joint at the opposite end of links 13 and 14 to provide a friction adjustment of the axis of the grip 26 with reference to links 14 and 13.

By the provision of these joints and the links it will be seen that links 13 and 14 can be swung through nearly 180° on the joint with clamp 10 as indicated by the dotted line position in Fig. 1, and for any position of links 13 and 14 the grip 22 can be swung on the joint between bracket 20 and links 13 and 14 through nearly 180°, thus providing that the grip may be coaxial with the body or may be made to assume any angle desired with respect to the body and may also be moved longitudinally of the body from the position indicated by the dotted lines at the left of Fig. 1 to the position shown in full lines at the right thereof. The grip 22 may be drilled as indicated by the dotted lines to provide an opening 27 through which the cord 28 may pass and this cord may be provided with a standard plug 29 for plugging into an electrical outlet.

While we have shown and described certain preferred forms of our invention herein, it will be understood that modifications and changes may be made without departing from the spirit and scope of our invention, as will be understood by those skilled in the art.

We claim:

1. In an electrically heated tool of the class described, in combination, a copper tip, a tubular aluminum body, an electrical heating element in the form of a readily removable rod positioned centrally of said body and extending longitudinally thereof and making direct and intimate contact with the interior wall of said body, said body having a tapered conical opening in the end thereof for receiving said tip, and said tip having a conical tapered portion to engage the opening in said body.

2. In an electrically heated tool of the class described, in combination, a tip having a conical seat portion to be heated for supplying heat to the work, a metallic body in the form of a hollow aluminum cylinder, said body having a conical seat in one end thereof for receiving said tip, and being internally screw-threaded from the opposite end to receive a heating element, and a screw-threaded heating element fitting in said body, the thermal inertia of said body being so related to the power rating of said heating element that idle tip temperature is not substantially greater than 200° F. higher than normal load tip temperature.

3. In an electrically heated tool of the class described, in combination, a copper tip having a conical seat portion to be heated for supplying heat to the work, a tubular aluminum body, said body having a conical seat in one end thereof for receiving said tip, and being internally screw-threaded from the opposite end to receive a heating element, and a screw-threaded heating element fitting in said body, the thermal inertia and heat loss characteristics of said body being so related to the power rating of said heating element that the temperature regulation of the tip between idling and normal load conditions is not substantially worse than 25% of the idling tip temperature.

4. In an electrically heated tool of the class described, in combination, a tip to be heated, said tip having a conical rear portion, a cylindrical tubular aluminum body having a conical tapered seat at one end for receiving said tip, and permitting quick indexing thereof, a heating element positioned longitudinally within said body, a handle, a link connection from said handle to said body, said link connection being angularly adjustable with respect to said body and said grip being angularly adjustable with respect to said link connection.

5. In an electrically heated tool of the class described, in combination, a tip to be heated for supplying heat to the work, said tip having a conical seat portion, a body in the form of a hollow aluminum cylinder, said body having a conical seat in one end thereof to receive said tip to permit quick indexing thereof in the form of a unitary, readily removable rod, and making direct contact with the interior surface of said body, a heating element positioned within said body and extending longitudinally thereof, a member secured to said grip and having a pivot offset axially thereof, a second member secured to said body and having a pivot offset axially thereof and links adjustably secured to said pivots at opposite ends respectively, whereby said grip may be adjusted from a position coaxial with said body to a position angularly offset from said body and adjustable longitudinally of said body.

WILBUR A. HAYES.
JOSEPH C. RYAN.